(12) United States Patent
Kim et al.

(10) Patent No.: US 9,677,667 B2
(45) Date of Patent: Jun. 13, 2017

(54) HYBRID TRANSMISSION FOR VEHICLE

(71) Applicant: Hyundai Motor Company, Seoul (KR)

(72) Inventors: Baek Yu Kim, Suwon-si (KR); Sung Gon Byun, Anyang-si (KR); Seok Joon Kim, Yongin-si (KR); Chul Min Ahn, Busan (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 14/626,226

(22) Filed: Feb. 19, 2015

(65) Prior Publication Data
US 2016/0091056 A1 Mar. 31, 2016

(30) Foreign Application Priority Data

Sep. 29, 2014 (KR) .................... 10-2014-0129967

(51) Int. Cl.
| | |
|---|---|
| *F16H 3/08* | (2006.01) |
| *F16H 61/684* | (2006.01) |
| *B60K 6/36* | (2007.10) |
| *B60K 6/547* | (2007.10) |
| *F16H 3/093* | (2006.01) |
| *B60K 6/387* | (2007.10) |
| *B60K 6/48* | (2007.10) |

(52) U.S. Cl.
CPC .............. *F16H 61/684* (2013.01); *B60K 6/36* (2013.01); *B60K 6/387* (2013.01); *B60K 6/48* (2013.01); *B60K 6/547* (2013.01); *F16H 3/093* (2013.01); *B60K 2006/4808* (2013.01); *B60K 2006/4825* (2013.01); *F16H 2003/0931* (2013.01); *F16H 2200/0056* (2013.01); *Y02T 10/626* (2013.01); *Y02T 10/6221* (2013.01); *Y02T 10/6252* (2013.01); *Y10S 903/917* (2013.01)

(58) Field of Classification Search
CPC ... B60K 6/36; B60K 6/48; B60K 6/50; B60K 6/405
USPC .......................................................... 74/661
See application file for complete search history.

(56) References Cited

U.S. PATENT DOCUMENTS

| | | | | |
|---|---|---|---|---|
| 6,251,042 B1 * | 6/2001 | Peterson | .................. | B60K 6/48 477/3 |
| 6,890,284 B2 * | 5/2005 | Sakamoto | ................ | B60K 6/48 477/109 |

(Continued)

FOREIGN PATENT DOCUMENTS

| | | |
|---|---|---|
| JP | 2010-513107 A | 4/2010 |
| JP | 2013-119280 A | 6/2013 |

(Continued)

*Primary Examiner* — Ha D Ho
(74) *Attorney, Agent, or Firm* — Morgan Lewis & Bockius LLP

(57) ABSTRACT

A hybrid transmission for a vehicle may include an input shaft configured to receive a power of an engine transferred thereto, an input clutch configured to connect the input shaft to the engine or to intercept connection of the input shaft to the engine, a motor directly connected to the input shaft, a first output shaft and a second output shaft provided with a plurality of driven gears that are tooth-engaged with a plurality of drive gears installed on the input shaft to form a plurality of gear shift stages, and a power control device provided to switch the power of the engine that is transferred to the first output shaft or the second output shaft.

7 Claims, 14 Drawing Sheets

(56) References Cited

U.S. PATENT DOCUMENTS

| | | | | |
|---|---|---|---|---|
| 7,082,850 B2* | 8/2006 | Hughes | ............... | B60K 6/36 74/3 |
| 7,249,537 B2* | 7/2007 | Lee | ............... | B60K 6/36 74/661 |
| 7,963,191 B2* | 6/2011 | Holmes | ............... | B60K 6/405 74/331 |
| 8,522,635 B2* | 9/2013 | Pastorello | ............... | B60K 6/48 74/330 |
| 9,120,481 B2* | 9/2015 | Blessing | ............... | B60W 30/192 |
| 2013/0288850 A1 | 10/2013 | Kaltenbach | | |
| 2014/0123806 A1* | 5/2014 | Lee | ............... | B60K 6/50 74/661 |

FOREIGN PATENT DOCUMENTS

| | | |
|---|---|---|
| JP | 2014-54937 A | 3/2014 |
| KR | 10-0852044 B1 | 8/2008 |
| KR | 10-2013-0115618 A | 10/2013 |
| KR | 10-2014-0059917 A | 5/2014 |
| KR | 10-2014-0083689 A | 7/2014 |

* cited by examiner

HYBRID TRANSMISSION FOR VEHICLE

CROSS-REFERENCE(S) TO RELATED APPLICATIONS

The present application claims priority to Korean Patent Application Number 10-2014-0129967 filed Sep. 29, 2014, the entire contents of which is incorporated herein for all purposes by this reference.

BACKGROUND OF THE INVENTION

Field of the Invention

Various aspects of the present invention relate to a hybrid transmission for a vehicle; and, particularly, to a technology of a transmission structure, which can improve shift quality through implementation of various traveling modes with a simple configuration.

Description of Related Art

An AMT (Automated Manual Transmission) can achieve both convenience of automatic gear shift according to the traveling state of a vehicle without intervention of a driver like an automatic transmission in the related art and high power transfer efficiency of a manual transmission in the related art.

However, during the gear shift, the AMT that is based on the manual transmission mechanism in the related art should necessarily accompany a process in which power that is transferred to drive wheels is intercepted while releasing the previous gear shift stage and shifting to the next gear shift stage, and this may cause gear shift impacts to occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid transmission for a vehicle which can prevent complete interception of motive power to a driving wheel during a gear shift process to improve the shift quality, and can implement various traveling modes with a simple configuration to improve fuel efficiency of the vehicle through efficient traveling that meets traveling situations of the vehicle.

According to various aspects of the present invention, a hybrid transmission for a vehicle may include an input shaft installed to receive a power of an engine transferred thereto, an input clutch installed to connect the input shaft to the engine or to intercept connection of the input shaft to the engine, a motor directly connected to the input shaft, a first output shaft and a second output shaft provided with a plurality of driven gears that are tooth-engaged with a plurality of drive gears installed on the input shaft to form a plurality of gear shift stages, and a power control device provided to switch the power of the engine that is transferred to the first output shaft or the second output shaft.

The power control device may include a first connection gear having a rotating shaft that is arranged to form a concentric shaft of the input shaft, a second connection gear tooth-engaged with the first connection gear and installed on the first output shaft in a state where its rotation is constrained, and a transmission clutch installed on the rotating shaft of the first connection gear to connect the power of the engine to the rotating shaft of the first connection gear or to intercept connection of the power of the engine to the rotating shaft of the first connection gear.

The input shaft may be formed as a hollow shaft, and the transmission clutch may be connected to the engine to penetrate a center of the input shaft.

The transmission clutch may be positioned in a space in a center portion of the motor.

The driven gears provided on the first output shaft may be configured to be tooth-engaged with the drive gears on the input shaft to form odd stages of a series of gear shift stages, and the driven gears provided on the second output shaft may be configured to be tooth-engaged with the drive gears on the input shaft to form even stages of a series of gear shift stages.

A first drive gear, a second drive gear, and a third drive gear may be provided on the input shaft, a first-stage driven gear that is tooth-engaged with the first drive gear to implement a first gear shift stage, a third-stage driven gear that is tooth-engaged with the second drive gear to implement a third gear shift stage, and a fifth-stage driven gear that is tooth-engaged with the third drive gear to implement a fifth gear shift stage may be provided on the first output shaft, and a second-stage driven gear that is tooth-engaged with the first drive gear to implement a second gear shift stage, a fourth-stage driven gear that is tooth-engaged with the second drive gear to implement a fourth gear shift stage, and a sixth-stage driven gear that is tooth-engaged with the third drive gear to implement a sixth gear shift stage may be provided on the second output shaft.

First and third-stage synchronizers respectively configured to make the first-stage driven gear or the third-stage driven gear be rotationally constrained by or unconstrained against the first output shaft, and a fifth-stage synchronizer configured to make the fifth-stage driven gear be rotationally constrained by or unconstrained against the first output shaft may be provided on the first output shaft, and second and fourth-stage synchronizers respectively configured to make the second-stage driven gear or the fourth-stage driven gear be rotationally constrained by or unconstrained against the second output shaft, and a sixth-stage synchronizer configured to make the sixth-stage driven gear be rotationally constrained by or unconstrained against the second output shaft may be provided on the second output shaft.

The input clutch may be a normal close clutch, and the transmission clutch may be a normal open clutch.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
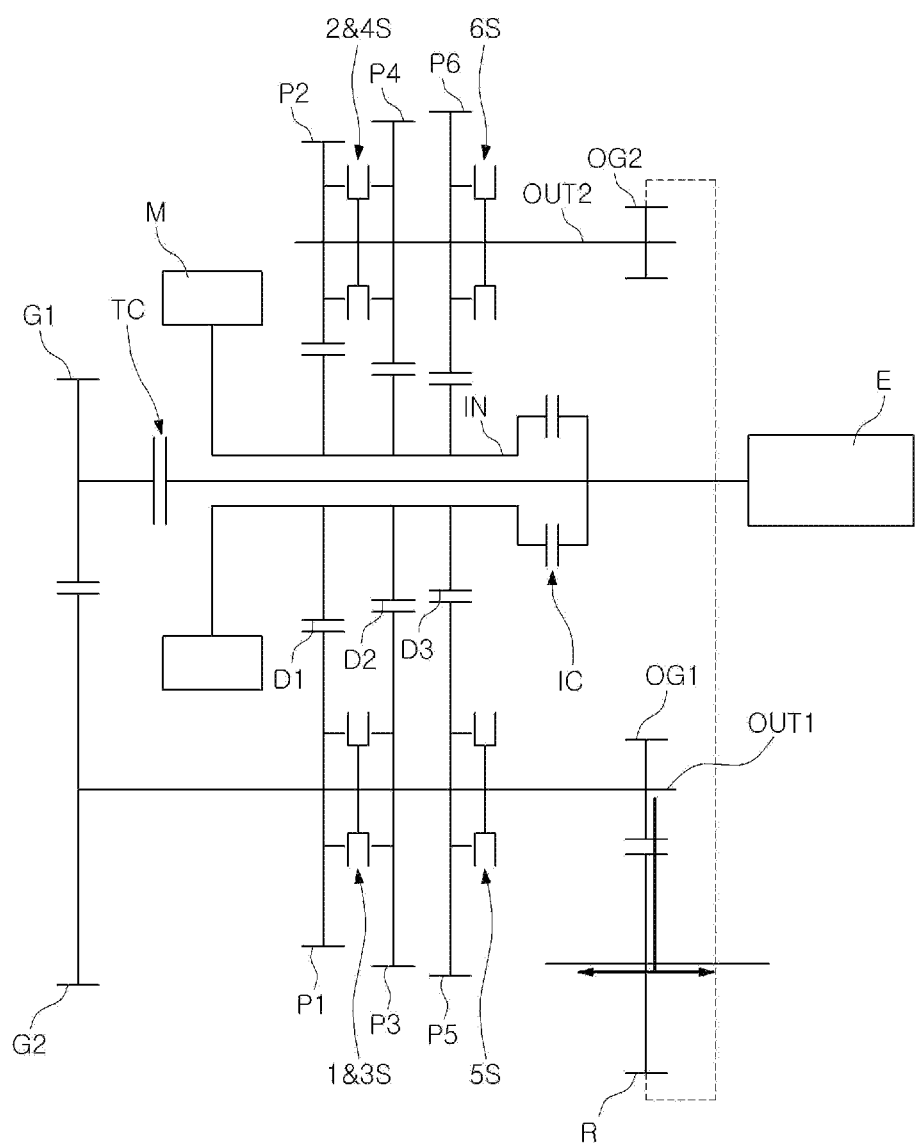
FIG. 1 is a diagram illustrating the configuration of an exemplary hybrid transmission for a vehicle according to the present invention.
Figure 2:
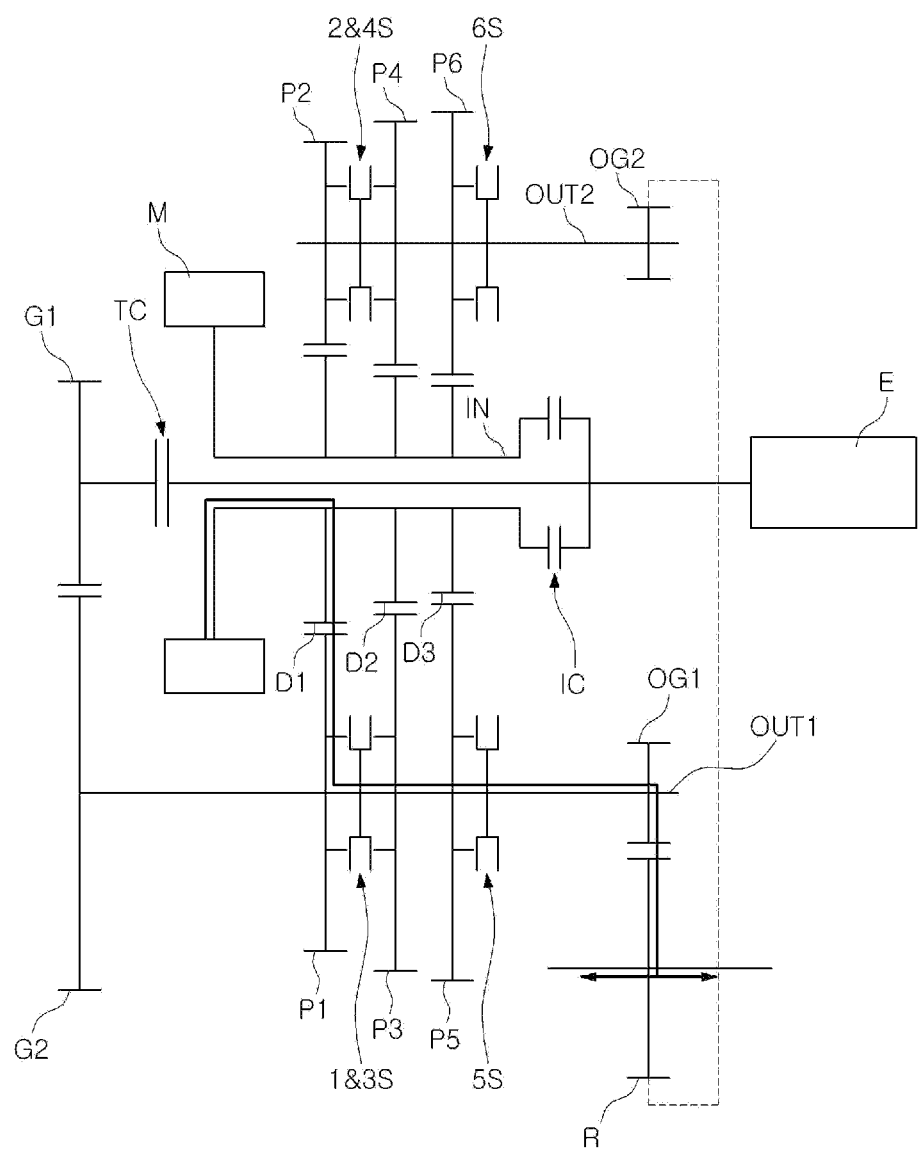
FIG. 2 is a diagram explaining implementation of a 1-speed EV mode in the transmission of FIG. 1.
Figure 3:
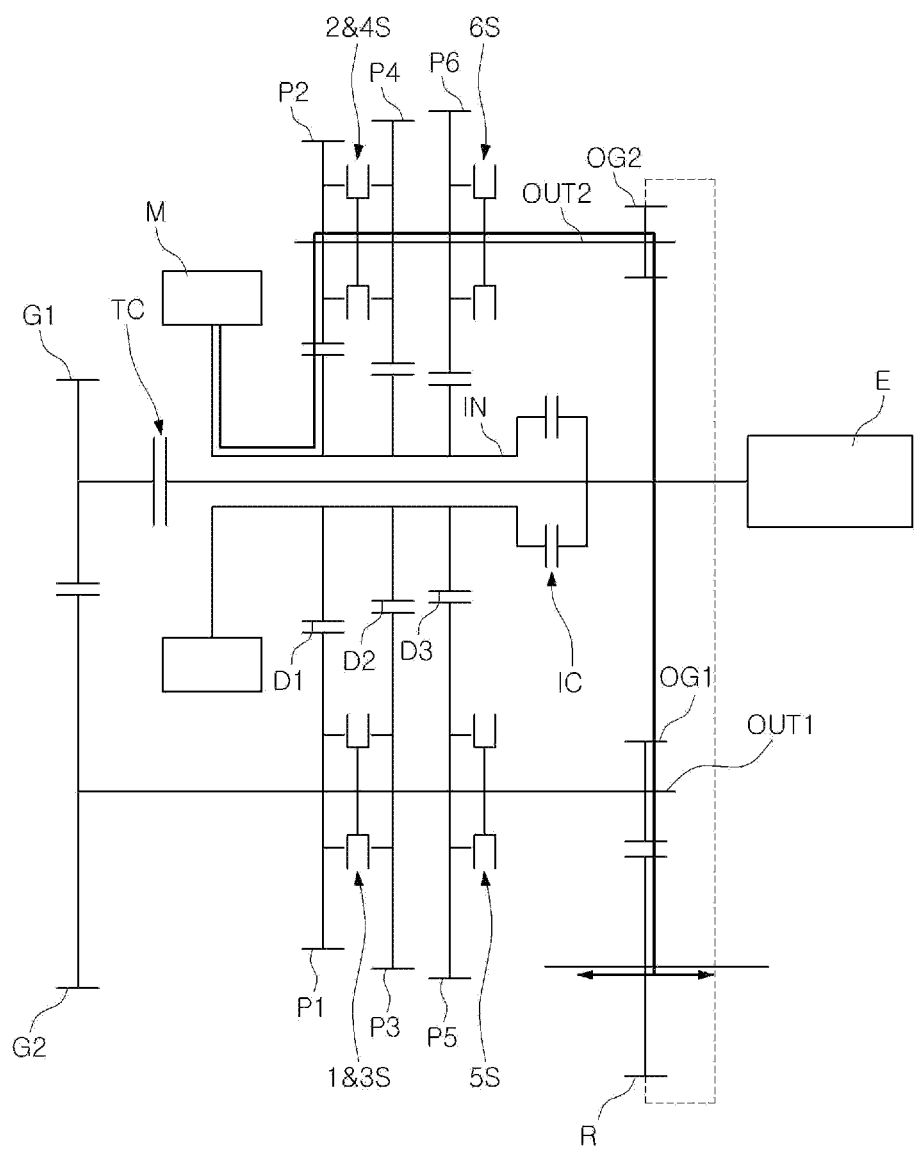
FIG. 3 is a diagram explaining implementation of a 2-speed EV mode in the transmission of FIG. 1.
Figure 4:
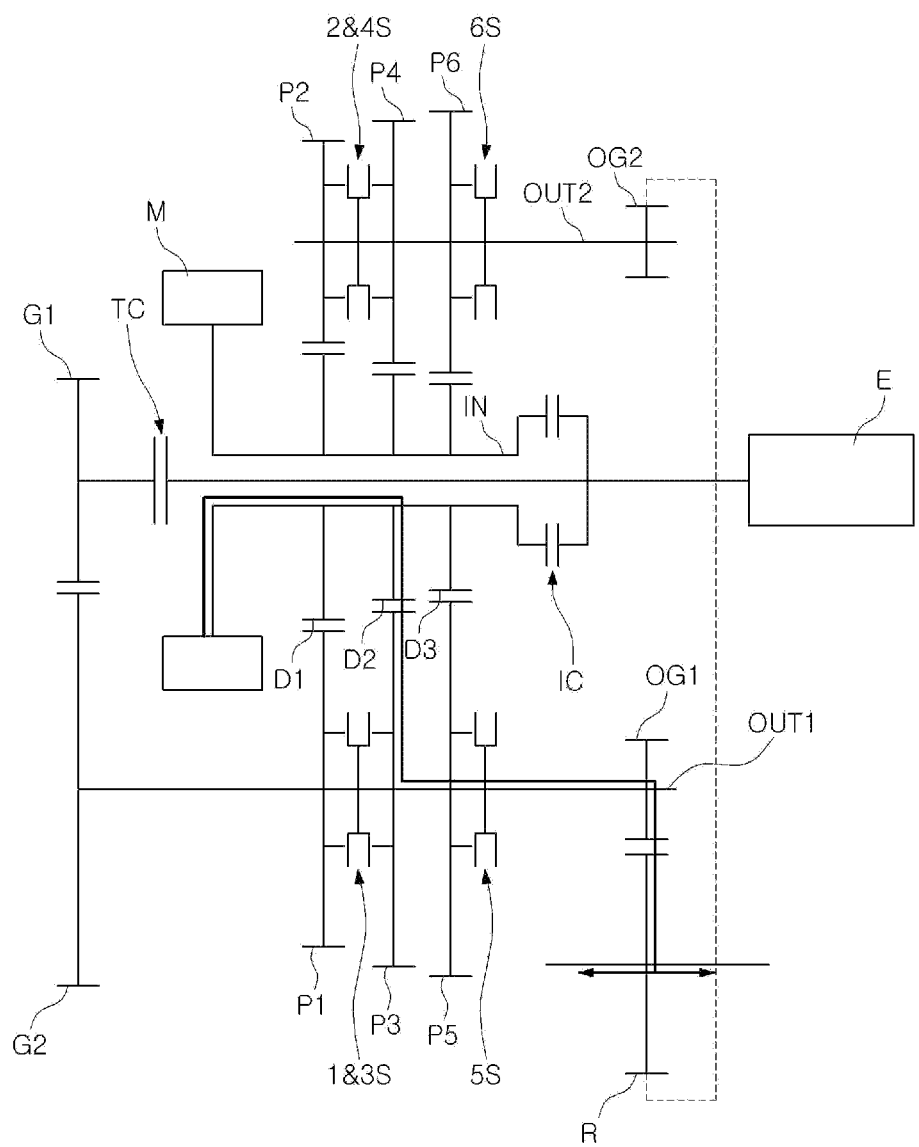
FIG. 4 is a diagram explaining implementation of a 3-speed EV mode in the transmission of FIG. 1.
Figure 5:
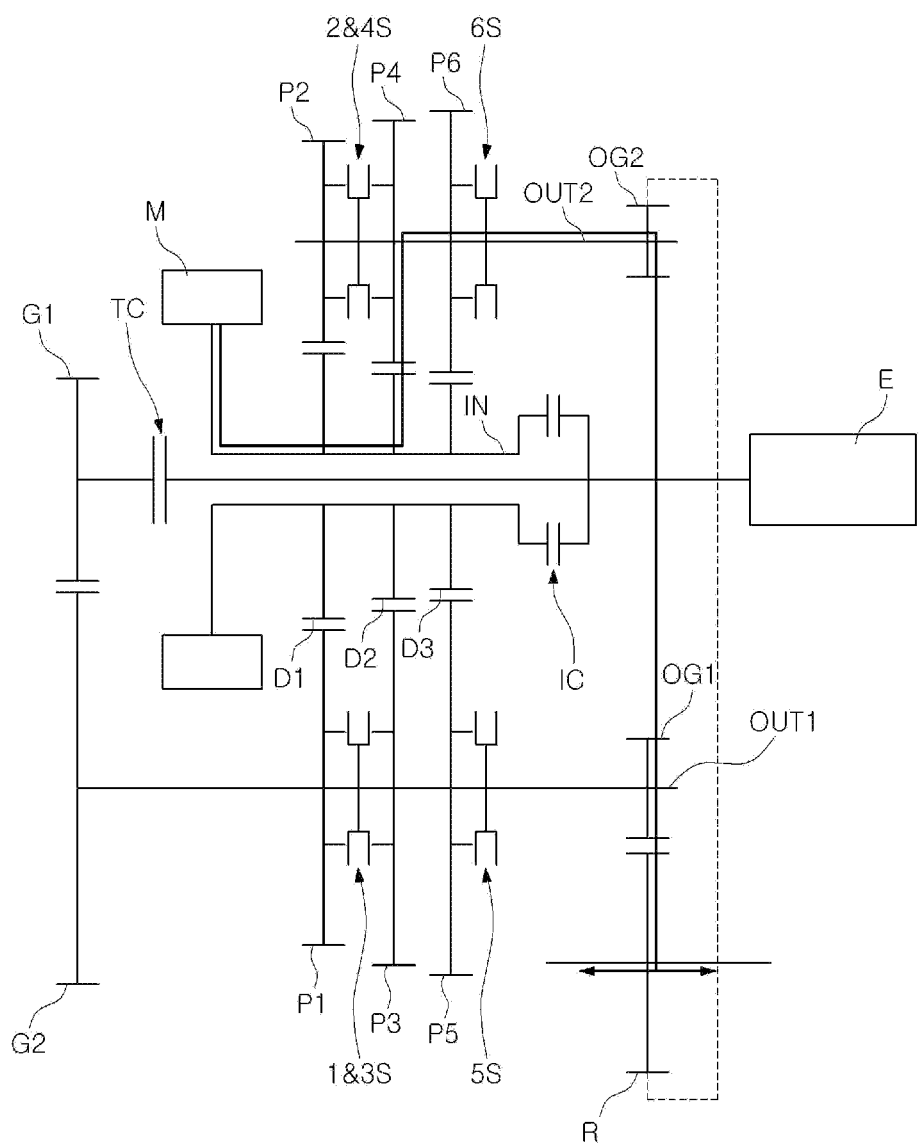
FIG. 5 is a diagram explaining implementation of a 4-speed EV mode in the transmission of FIG. 1.
Figure 6:
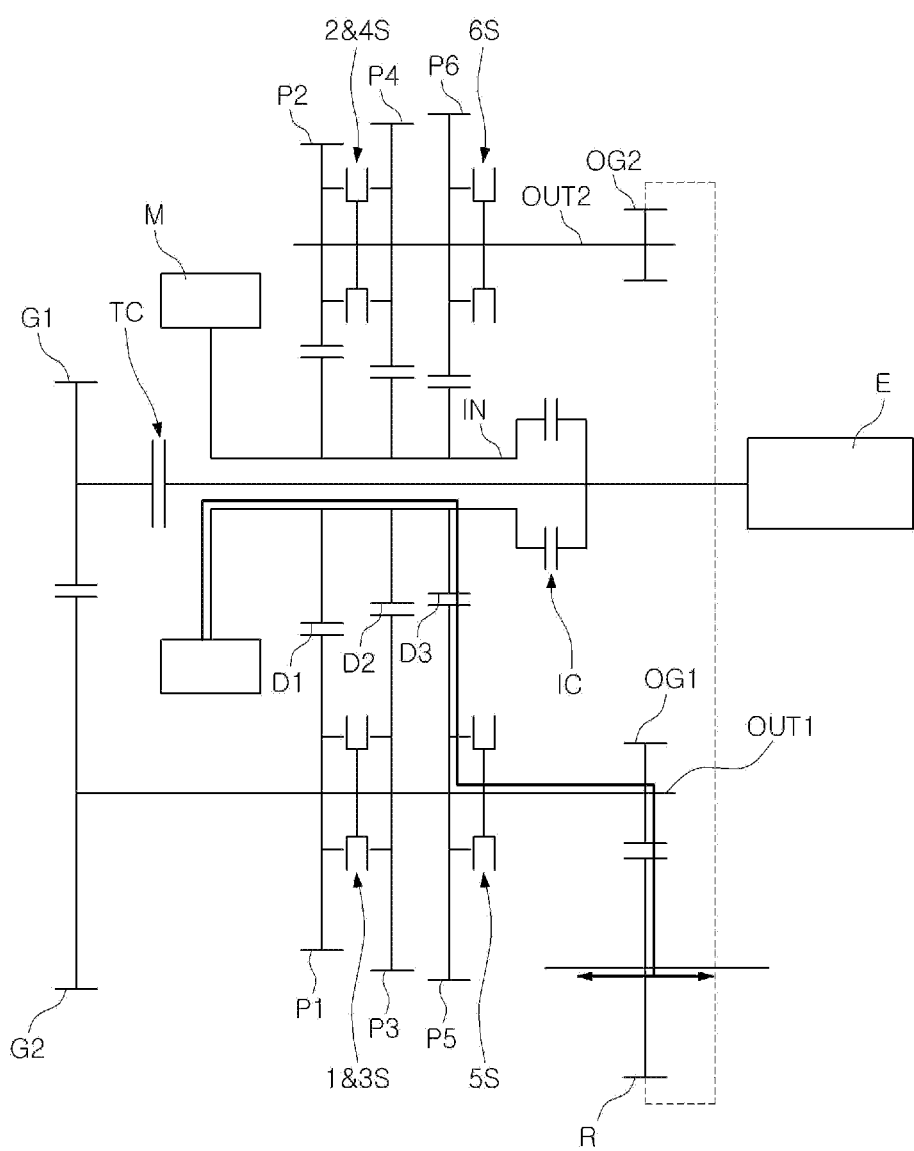
FIG. 6 is a diagram explaining implementation of a 5-speed EV mode in the transmission of FIG. 1.
Figure 7:
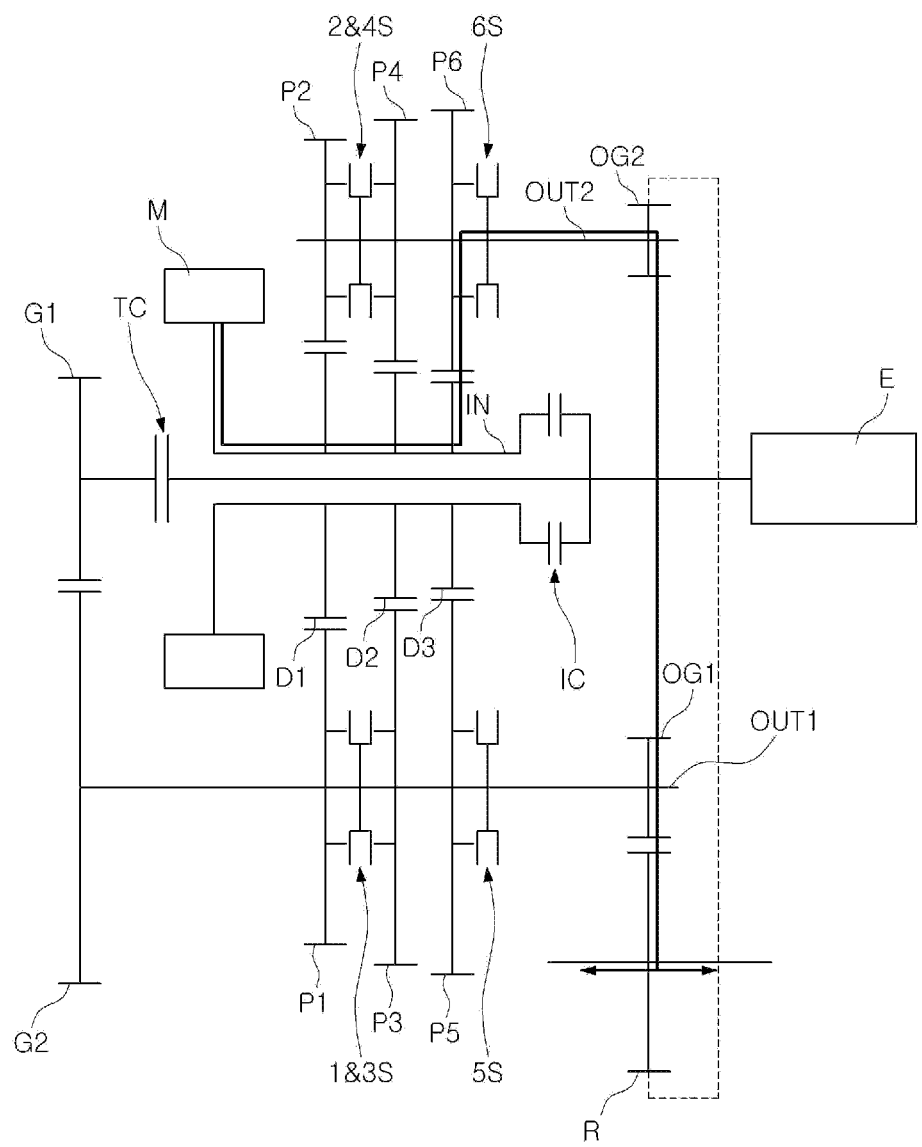
FIG. 7 is a diagram explaining implementation of a 6-speed EV mode in the transmission of FIG. 1.

Referring to FIG. 1, a hybrid transmission for a vehicle in accordance with various embodiments of the present invention is configured to include an input shaft IN installed to receive a power of an engine E transferred thereto; an input clutch IC installed to connect the input shaft IN to the engine E or to intercept connection of the input shaft to the engine E; a motor M directly connected to the input shaft IN; a first output shaft OUT1 and a second output shaft OUT2 provided with a plurality of driven gears that are tooth-engaged with a plurality of drive gears installed on the input shaft IN to form a plurality of gear shift stages; and a power control means provided to switch the power of the engine E that is transferred to the first output shaft OUT1 or the second output shaft OUT2.

That is, in accordance with various embodiments of the present invention, the input shaft IN is configured to receive both the power of the engine and a power of the motor that are transferred thereto, and the first output shaft OUT1 and the second output shaft OUT2 are provided with the driven gears that are tooth-engaged with the drive gears provided on the input shaft IN to form the respective hear shift stages. Further, the power control means is configured to switch the power of the engine E that is transferred to the first output shaft OUT1 and the second output shaft OUT2, and thus can continuously transfer the power of the engine E to drive wheels during a gear shift operation to solve the problem that the power transfer to the drive wheels is intercepted during the gear shift operation in the related art.

In various embodiments, the power control means is configured to include a first connection gear G1 having a rotating shaft that is arranged to form a concentric shaft of the input shaft IN; a second connection gear G2 tooth-engaged with the first connection gear G1 and installed on the first output shaft OUT1 in a state where its rotation is constrained; and a transmission clutch TC installed on the rotating shaft of the first connection gear G1 to connect the power of the engine E to the rotating shaft of the first connection gear G1 or to intercept connection of the power of the engine E to the rotating shaft of the first connection gear G1.

Accordingly, once the transmission clutch TC is engaged during the gear shift operation, the power of the engine E is directly transferred to the first output shaft OUT1 through the first connection gear G1 and the second connection gear G2.

In various embodiments, the input shaft IN is formed as a hollow shaft, and the transmission clutch TC is connected to the engine E to penetrate a center of the input shaft IN. Since the transmission clutch TC is positioned in a space in a center portion of the motor, a more compact transmission can be provided, and the mount performance of the transmission on a vehicle can be improved.

The driven gears provided on the first output shaft OUT1 are configured to be tooth-engaged with the drive gears on the input shaft IN to form odd stages of a series of gear shift stages, and the driven gears provided on the second output shaft OUT2 are configured to be tooth-engaged with the drive gears on the input shaft IN to form even stages of a series of gear shift stages.

In various embodiments, a first drive gear D1, a second drive gear D2, and a third drive gear D3 are provided on the input shaft IN; and a first-stage driven gear P1 that is tooth-engaged with the first drive gear D1 to implement a first gear shift stage, a third-stage driven gear P3 that is tooth-engaged with the second drive gear D2 to implement a third gear shift stage, and a fifth-stage driven gear P5 that is tooth-engaged with the third drive gear D3 to implement a fifth gear shift stage are provided on the first output shaft OUT1.

Further, a second-stage driven gear P2 that is tooth-engaged with the first drive gear D1 to implement a second gear shift stage, a fourth-stage driven gear P4 that is tooth-engaged with the second drive gear D2 to implement a fourth gear shift stage, and a sixth-stage driven gear P6 that is tooth-engaged with the third drive gear D3 to implement a sixth gear shift stage are provided on the second output shaft OUT2.

First and third-stage synchronizers 1&3S respectively configured to make the first-stage driven gear P1 or the third-stage driven gear P3 be rotationally constrained by or unconstrained against the first output shaft OUT1, and a fifth-stage synchronizer 5S configured to make the fifth-stage driven gear P5 be rotationally constrained by or unconstrained against the first output shaft OUT1 are provided on the first output shaft OUT1.

Further, second and fourth-stage synchronizers 2&4S respectively configured to make the second-stage driven gear P2 or the fourth-stage driven gear P4 be rotationally constrained by or unconstrained against the second output shaft OUT2, and a sixth-stage synchronizer 6S configured to make the sixth-stage driven gear P6 be rotationally constrained by or unconstrained against the second output shaft OUT2 are provided on the second output shaft OUT2.

The input clutch IC is composed of a normal close type clutch, and the transmission clutch TC is composed of a normal open type clutch. In a typical vehicle traveling situation, energy that is consumed to operate the respective clutches is relatively reduced, and thus fuel efficiency of the vehicle can be improved.

The input clutch IC should be engaged in a HEV mode to be described above, and if the input clutch IC is composed of a normal close type clutch under the assumption that vehicle traveling is performed substantially in the HEV mode, the normal close type input clutch EC does not require a separate operation force in most cases, and consumes an operation force for an unconstraining operation only during the gear shifting or in an EV mode. In contrast, since the transmission clutch TC is used only during the gear shifting, it is composed of a normal open type clutch, and thus the energy that is consumed to operate the clutch can be minimized.

Of course, since a first output gear OG1 is provided on the first output shaft OUT1, a second output gear OG2 is provided on the second output shaft OUT2, and the first output gear OG1 and the second output gear OG2 are tooth-engaged with a differential ring gear R, the power can be transferred to the respective drive wheels.

FIG. 2, FIG. 3, FIG. 4, FIG. 5, FIG. 6 and FIG. 7 illustrate 1-speed EV mode to 6-speed EV mode. In the 1-speed EV mode of FIG. 2, the first and third-stage synchronizers 1&3S connect the first-stage driven gear P1 to the first output shaft OUT1, and in the 2-speed EV mode of FIG. 3, the second and fourth-stage synchronizers 2&4S connect the second-stage driven gear P2 to the second output shaft OUT2. In the 3-speed EV mode of FIG. 4, the first and third-stage synchronizers 1&3S connect the third-stage driven gear P3 to the first output shaft OUT1, and in the 4-speed EV mode of FIG. 5, the second and fourth-stage synchronizers 2&4S connect the fourth-stage driven gear P4 to the second output shaft OUT2. Further, in the 5-speed EV mode of FIG. 6, the fifth-stage synchronizer 5S connects the fifth-stage driven gear P5 to the first output shaft OUT1, and in the 6-speed EV mode of FIG. 7, the sixth-stage synchronizer 6S connects the sixth-stage driven gear P6 to the second output shaft OUT2. By driving the motor in the above-described states, the respective gear shift stages are implemented.

FIG. 8, FIG. 9, FIG. 10, FIG. 11, FIG. 12 and FIG. 13 successively illustrate 1-speed HEV mode to 6-speed HEV mode. In the 1-speed HEV mode of FIG. 8, the first and third-stage synchronizers 1 &3S connect the first-stage driven gear P1 to the first output shaft OUT1, and in the 2-speed HEV mode of FIG. 9, the second and fourth-stage synchronizers 2&4S connect the second-stage driven gear P2 to the second output shaft OUT2. In the 3-speed HEV mode of FIG. 10, the first and third-stage synchronizers 1&3S connect the third-stage driven gear P3 to the first output shaft OUT1, and in the 4-speed HEV mode of FIG. 11, the second and fourth-stage synchronizers 2&4S connect the fourth-stage driven gear P4 to the second output shaft OUT2. Further, in the 5-speed HEV mode of FIG. 12, the fifth-stage synchronizer 5S connects the fifth-stage driven gear P5 to the first output shaft OUT1, and in the 6-speed HEV mode of FIG. 13, the sixth-stage synchronizer 6S connects the sixth-stage driven gear P6 to the second output shaft OUT2. If the power of the engine E is transferred to the input shaft IN through providing of the motor M and engagement of the input clutch IC, the power of the motor M and the power of the engine E are summed on the input shaft IN, gear shift is performed through the respective gear shift stages, and the power of the engine E is transferred to the differential ring gear R.

Figure 8:
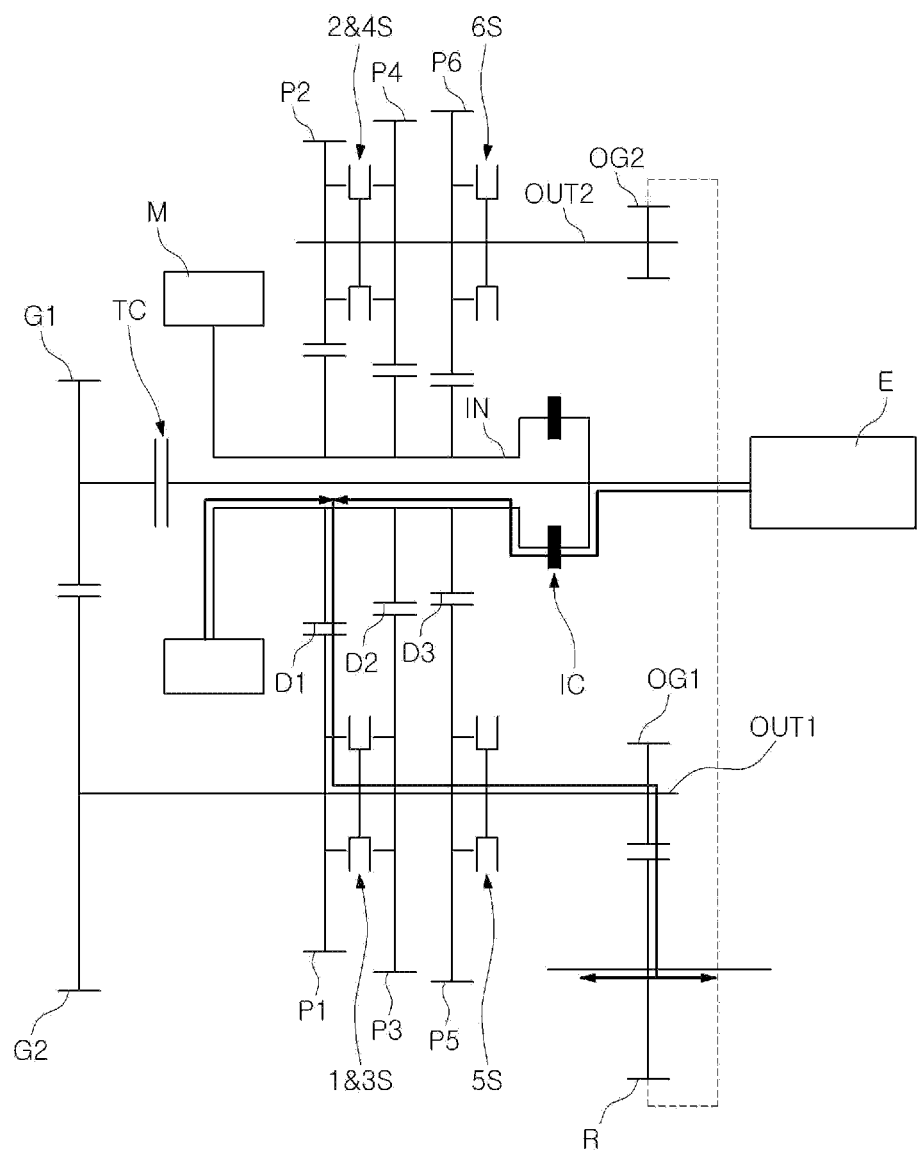
FIG. 8 is a diagram explaining implementation of a 1-speed HEV mode in the transmission of FIG. 1.
Figure 9:
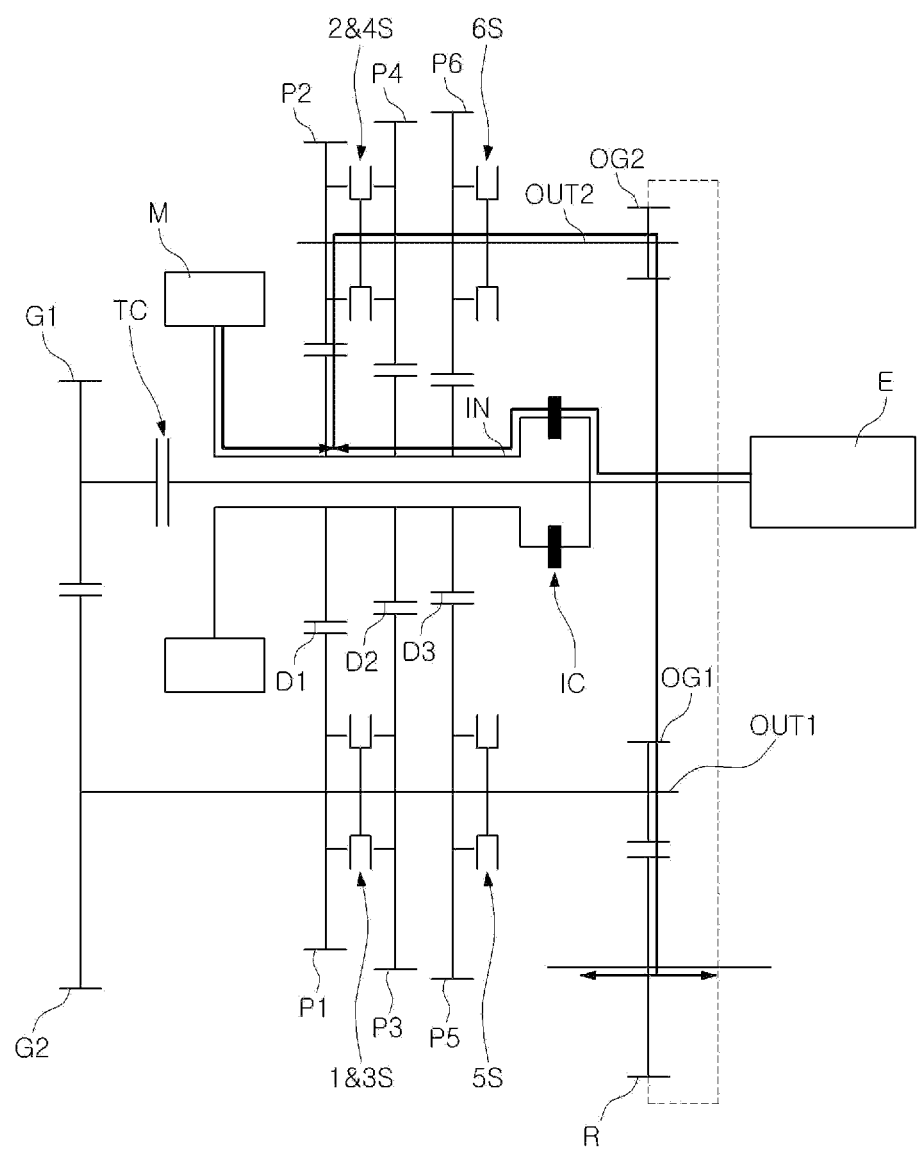
FIG. 9 is a diagram explaining implementation of a 2-speed HEV mode in the transmission of FIG. 1.
Figure 10:
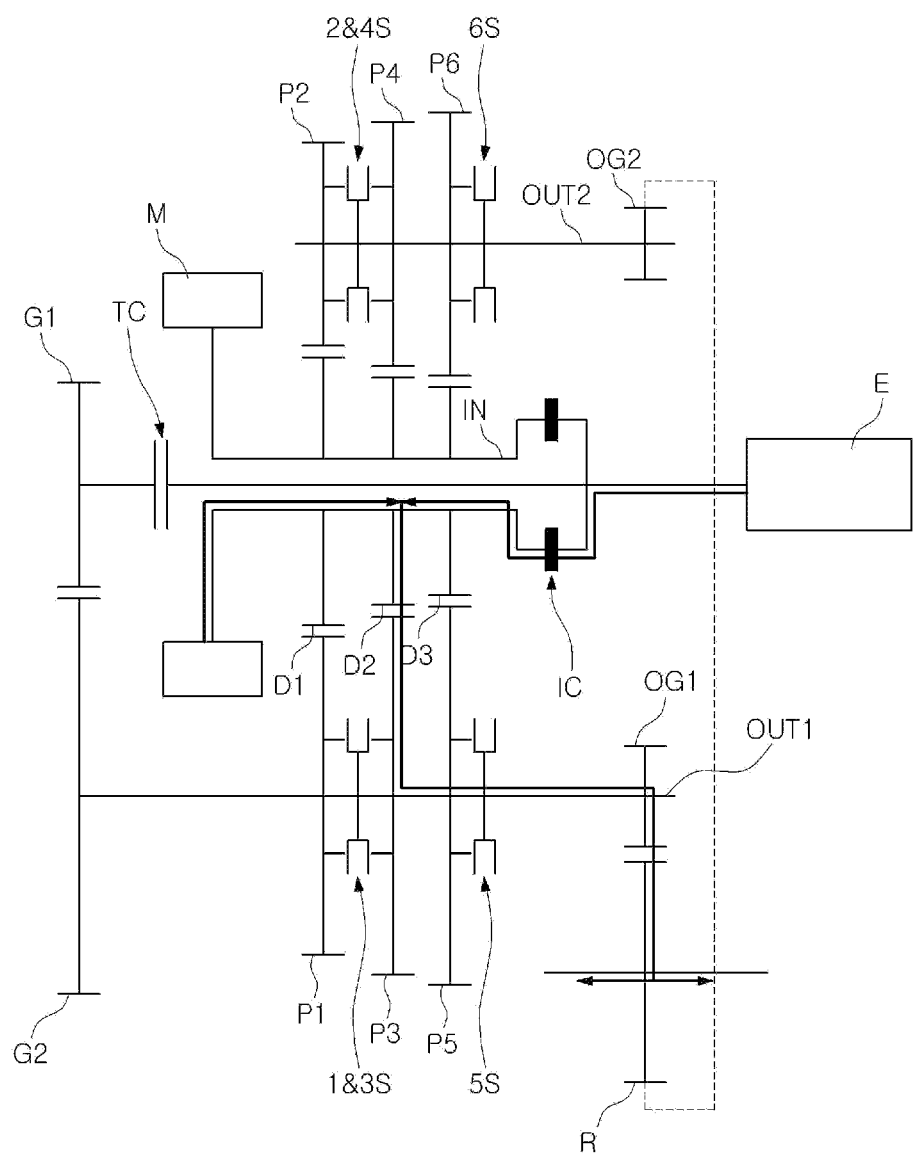
FIG. 10 is a diagram explaining implementation of a 3-speed HEV mode in the transmission of FIG. 1.
Figure 11:
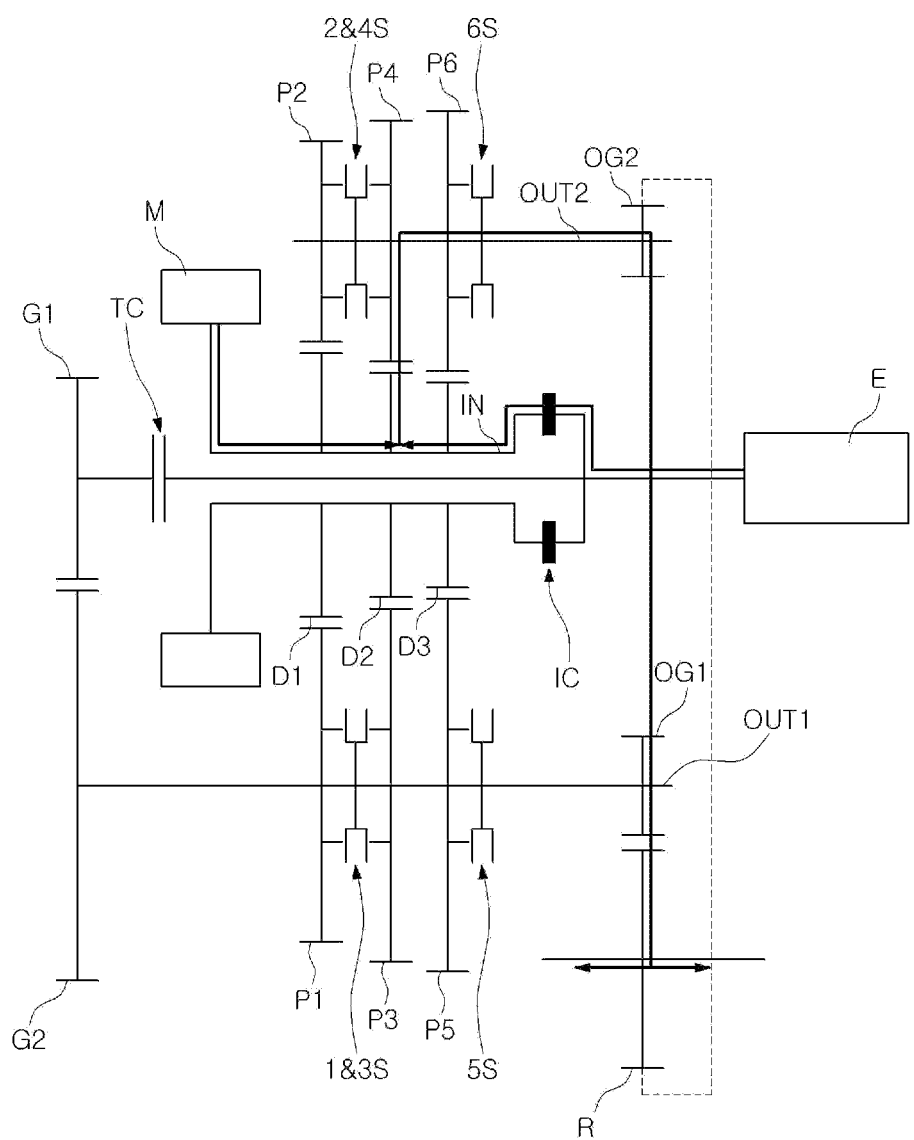
FIG. 11 is a diagram explaining implementation of a 4-speed HEV mode in the transmission of FIG. 1.
Figure 12:
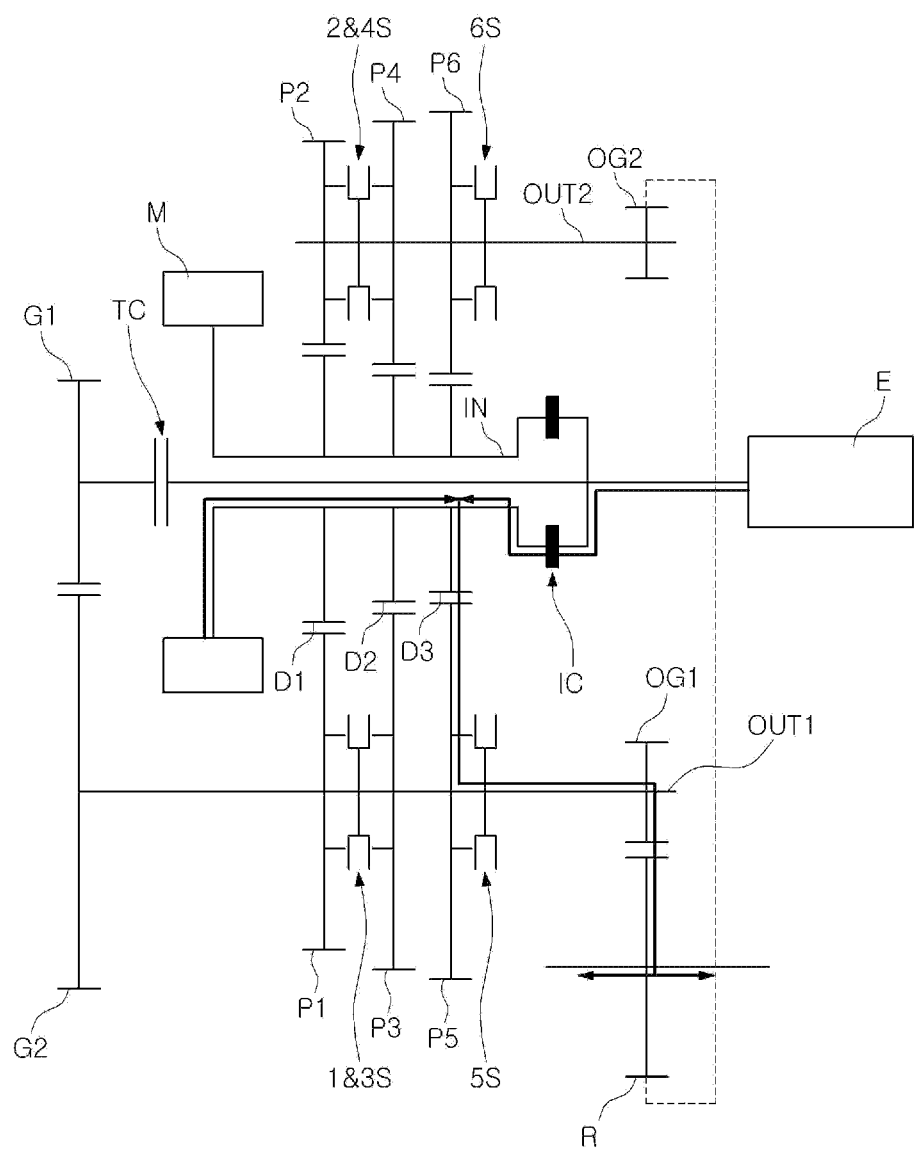
FIG. 12 is a diagram explaining implementation of a 5-speed HEV mode in the transmission of FIG. 1.
Figure 13:
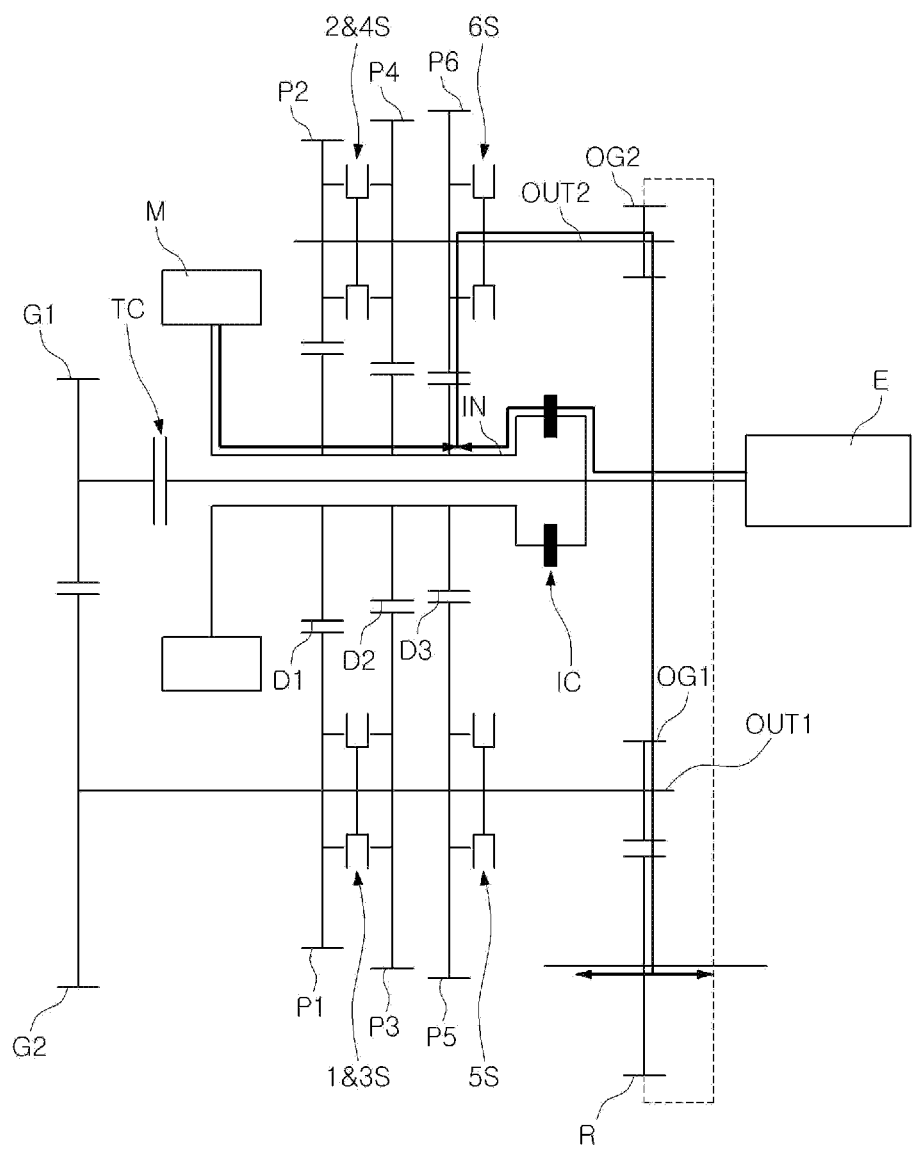
FIG. 13 is a diagram explaining implementation of a 6-speed HEV mode in the transmission of FIG. 1.
Figure 14:
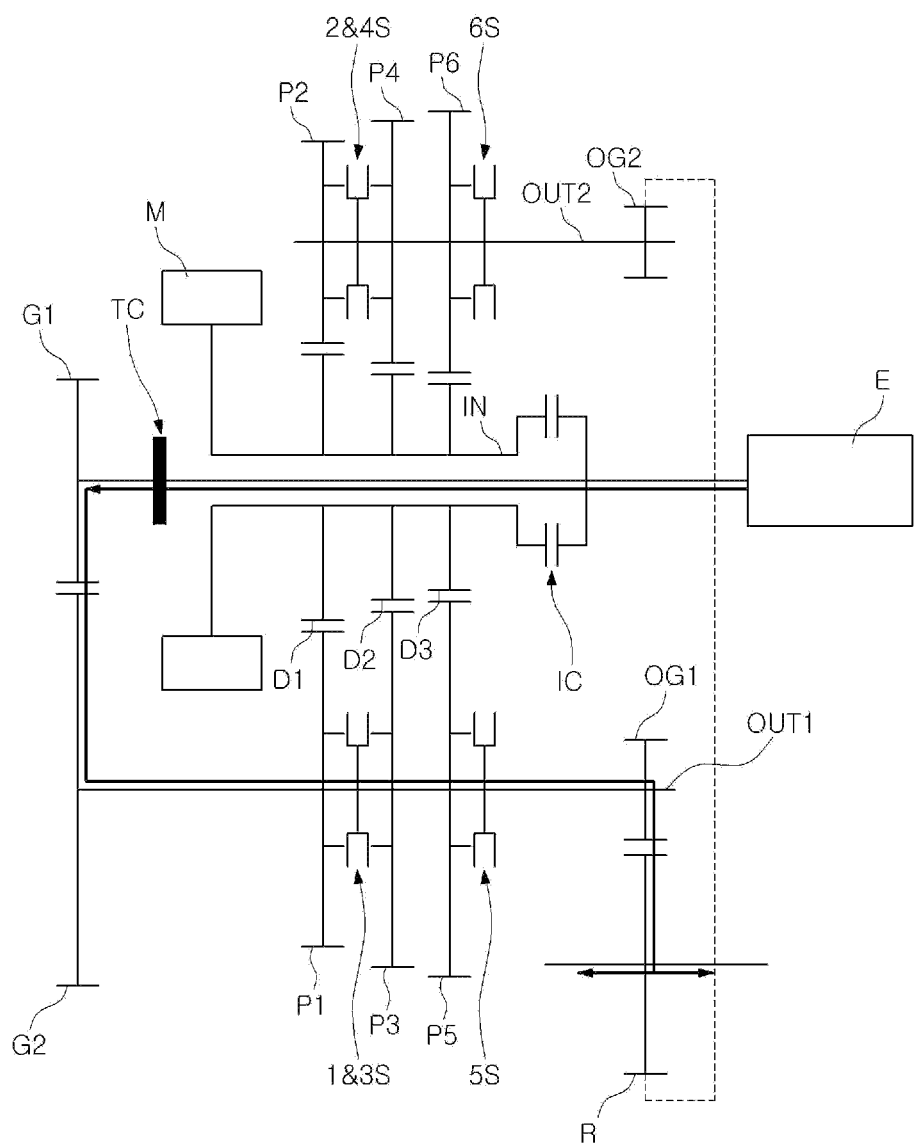
FIG. 14 is a diagram explaining a process in which the transmission of FIG. 1 performs gear shift from a state of FIG. 8 to a state of FIG. 9 according to the present invention.

On the other hand, a gear shifting process from the 1-speed HEV mode of FIG. 8 to the 2-speed HEV mode of FIG. 9 will be described with reference to FIG. 14. If the input clutch IC is released while the transmission clutch TC is engaged, the power of the engine E transferred to the input shaft IN is intercepted, but the power of the engine E is continuously transferred to the first output shaft OUT1 through the transmission clutch TC, the first connection gear G1, and the second connection gear G2.

Accordingly, the power of the engine E is continuously transferred to the drive wheels, and the input shaft IN is free from the engine E. In this state, if the input clutch IC is engaged after the first and third-stage synchronizers 1 &3S are released and the second and fourth-stage synchronizers 2&4S connect the second-stage driven gear P2 to the second output shaft OUT2, the power is continuously transferred to the drive wheels without interception of the power transfer to the drive wheels in such a process.

According to the present invention, the complete interception of the power to the driving wheel during the gear shift process can be prevented to improve the shift quality, and various traveling modes can be implemented with a simple configuration to improve the fuel efficiency of the vehicle through the efficient traveling that meets the traveling situations of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A hybrid transmission for a vehicle comprising:
an input shaft configured to receive a power of an engine transferred thereto;
an input clutch configured to connect the input shaft to the engine or to intercept connection of the input shaft to the engine;
a motor directly connected to the input shaft;
a first output shaft and a second output shaft provided with a plurality of driven gears that are tooth-engaged with a plurality of drive gears mounted on the input shaft to form a plurality of gear shift stages; and
a power control device provided to switch the power of the engine that is transferred to the first output shaft or the second output shaft,
wherein the power control device comprises:
a first connection gear having a rotating shaft that is arranged to form a concentric shaft of the input shaft;
a second connection gear tooth-engaged with the first connection gear and installed on the first output shaft in a state where rotation thereof is constrained; and a transmission clutch installed on the rotating shaft of the first connection gear to connect the power of the engine to the rotating shaft of the first connection gear or to intercept connection of the power of the engine to the rotating shaft of the first connection gear.

2. The hybrid transmission of claim 1, wherein the input shaft is formed as a hollow shaft, and the transmission clutch is connected to the engine by penetrating a center of the input shaft.

3. The hybrid transmission of claim 2, wherein the transmission clutch is positioned in a space in a center portion of the motor.

4. The hybrid transmission of claim 1, wherein the driven gears provided on the first output shaft are tooth-engaged with the drive gears on the input shaft to form odd stages of a series of gear shift stages, and the driven gears provided on the second output shaft are tooth-engaged with the drive gears on the input shaft to form even stages of a series of gear shift stages.

5. The hybrid transmission of claim 4, wherein a first drive gear, a second drive gear, and a third drive gear are mounted on the input shaft, a first-stage driven gear that is tooth-engaged with the first drive gear to implement a first gear shift stage, a third-stage driven gear that is tooth-engaged with the second drive gear to implement a third gear shift stage, and a fifth-stage driven gear that is tooth-engaged with the third drive gear to implement a fifth gear shift stage are provided on the first output shaft, and a second-stage driven gear that is tooth-engaged with the first drive gear to implement a second gear shift stage, a fourth-stage driven gear that is tooth-engaged with the second drive gear to implement a fourth gear shift stage, and a sixth-stage driven gear that is tooth-engaged with the third drive gear to implement a sixth gear shift stage are provided on the second output shaft.

6. The hybrid transmission of claim 5, wherein first and third-stage synchronizers respectively configured to make the first-stage driven gear or the third-stage driven gear be rotationally constrained by or unconstrained against the first output shaft, and a fifth-stage synchronizer configured to make the fifth-stage driven gear be rotationally constrained by or unconstrained against the first output shaft are provided on the first output shaft, and second and fourth-stage synchronizers respectively configured to make the second-stage driven gear or the fourth-stage driven gear be rotationally constrained by or unconstrained against the second output shaft, and a sixth-stage synchronizer configured to make the sixth-stage driven gear be rotationally constrained by or unconstrained against the second output shaft are provided on the second output shaft.

7. The hybrid transmission of claim 1, wherein the input clutch is a normal close clutch, and the transmission clutch is a normal open clutch.

* * * * *